Nov. 17, 1942.  D. M. DOW ET AL  2,302,110
OVERLOAD RELEASE CLUTCH
Filed Oct. 9, 1939
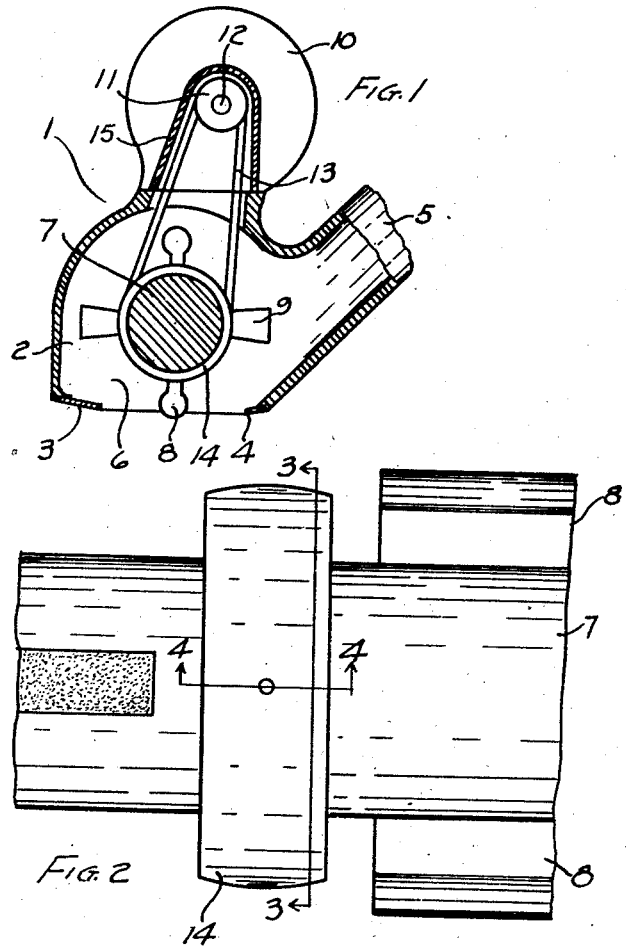
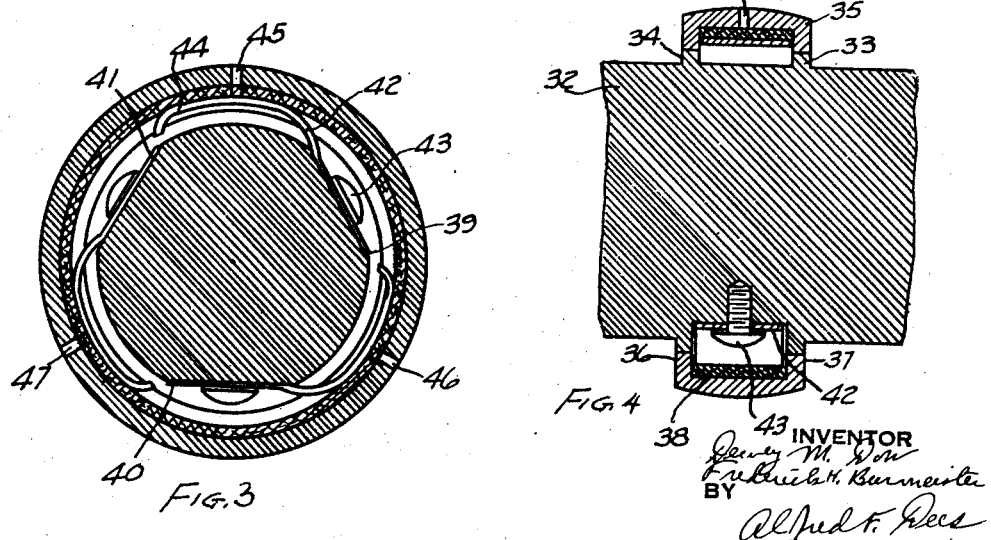

Patented Nov. 17, 1942

2,302,110

UNITED STATES PATENT OFFICE 2,302,110

OVERLOAD RELEASE CLUTCH

Dewey M. Dow and Frederick H. Burmeister, Toledo, Ohio, assignors to Air-Way Electric Appliance Corporation, Toledo, Ohio, a corporation of Delaware Application October 9, 1939, Serial No. 298,609

4 Claims. (Cl. 64—30)

This invention relates to overload release clutches and has as its general object to provide a compact overload release clutch incorporated in a pulley and shaft assembly such as, for example, the agitator spindle of a vacuum cleaner. A specific object of the invention is to provide a vacuum cleaner agitator spindle incorporating in the pulley an overload release clutch.

A further object of the invention is to provide a spindle or pulley assembly incorporating an overload release clutch adapted to permit ready disassembly of the device for the inspection and replacement of parts.

Other and further objects of the invention will appear to those skilled in the art to which this invention appertains, from a study of the description taken in connection with the accompanying drawing in which:

Fig. 1 is a vertical sectional view of the floor tool of a vacuum cleaner embodying the invention.

Fig. 2 is a front elevation of a portion of the agitator spindle.

Fig. 3 is a transverse sectional view of the clutch taken on the line 3—3 of Fig. 2.

Fig. 4 is an axial sectional view of the clutch taken on line 4—4 of Fig. 2.

As an example of one form in which the invention may be embodied, we have shown in the drawing a floor tool 1 of a vacuum cleaner having a suction tube 5 by means of which the floor tool is connected to a suitable suction fan. The floor tool 1 has a suction chamber 2 and an inlet mouth 6, the latter being defined by the lips 3 and 4.

Rotatably mounted in the chamber 2 is an agitator 7 having beater elements 8 and brush elements 9. Mounted on top of the floor tool is a motor 10 having an armature shaft 12 on one end of which is secured a pulley 11. Drive is transmitted from the motor 10 to the agitator 7 by means of a belt 13 traveling over the pulleys 11 and 14.

The pulley-clutch mechanism includes a pair of axially spaced collars 33 and 34 formed integrally with the spindle 32 of the agitator 7, and a pulley rim 35 which is U shaped in cross-section, having side flanges 36 and 37 encircling and in the same plane with the collars 33 and 34.

Fitted in the annular channel within the pulley rim 35 is a friction liner 38, which may be of any conventional brake or clutch lining material.

Between the collars 33 and 34 a spindle 32 is provided with a plurality of flat surfaces 39, 40 and 41, which are equally spaced circumferentially. Secured by appropriate means 43 to each of these flat surfaces is a clutch element in the form of a leaf spring 42 having a projecting portion 44 extending circumferentially and yieldingly engaging the friction liner 38.

Being received between the flanges 36 and 37 of the pulley rim, the projecting portions 44 of the clutch elements cooperate with the pulley rim to retain the latter against axial displacement. When it is desired to disassemble the clutch, the projecting portions 44 of the clutch elements are pushed inwardly by a suitable tool or tools inserted through openings 45, 46 and 47 in the rim 35, until they are entirely received in the annular space between the collars 33 and 34, whereupon the flanges 36 and 37 of the pulley rim will clear the clutch elements, permitting the rim to be slid axially off of the collars 33 and 34. Conversely, when it is desired to assemble the pulley rim on the collars 33 and 34, the clutch elements are depressed until the rim can be slipped over them.

The engagement of the clutch elements with the facing 38 provides an overload release drive connection between the rim and the spindle.

We claim:

1. In combination with a rotary element provided with a depression, a clutch element comprising a leaf spring having a portion secured to the rotary element in said depression and another portion projecting beyond the peripheral surface of the rotary element and adapted to yield under pressure so as to be received in said depression, a rim having side flanges rotatably mounted on the rotary element and embracing said projecting portion of the clutch element so as to be retained against axial displacement, said projecting clutch element portion frictionally engaging the inner surface of said rim so as to establish a drive between said rim and rotary element adapted to release under overload, and an opening in said rim through which a tool is adapted to be inserted for depressing said clutch element and thereby permitting axial withdrawal of said rim from the rotary element.

2. The combination as defined in claim 1, wherein said depression is defined between a pair of axially spaced radially projecting collars on the rotary element, registering with said side flanges to form the clutch enclosure.

3. In combination with a rotary element having a depression, an overload release clutch including a clutch element in the form of a leaf spring having a portion secured to said rotary element in said depression and another portion projecting beyond the peripheral surface of said rotary element and adapted to yield under pressure so as to be received in said depression, a rim having side flanges rotatably mounted on said rotary element and embracing said projecting portion of the clutch element so as to be retained against axial displacement, said projecting clutch element portion frictionally engaging in the inner surface of said rim so as to establish a drive between said rim and rotary element adapted to release under overload, said clutch element when retracted into said depression permitting separation of said rim from said rotary element.

4. In combination with a rotary element having a pair of axially spaced collars and having a plurality of flat surfaces between said collars, a plurality of clutch elements in the form of leaf springs each having a portion secured to a respective one of said flat surfaces and another portion projecting beyond the peripheral surface of said rotary element and extending circumferentially, a drive transmitting rim, U shaped in cross section, encircling said collars receiving said circumferentially extending clutch element portions and thereby retained against axial displacement, the interior of said rim being yieldably engaged by the peripheral surfaces of said circumferentially extending spring portions to provide an overload release clutching connection between said rim and rotary element.

DEWEY M. DOW.
FREDERICK H. BURMEISTER.